(12) United States Patent
Wu et al.

(10) Patent No.: US 9,678,554 B2
(45) Date of Patent: Jun. 13, 2017

(54) LOW POWER MODE OPERATION WHEN CHARGING A DEVICE

(71) Applicant: Nuvoton Technology Corporation, Hsinchu (TW)

(72) Inventors: Chun-Yi Wu, New Taipei (TW); Ping-Ying Chu, Hsinchu (TW); Shih-Hsuan Yen, Hsinchu County (TW); Shih-Hsuan Hsu, Taoyuan County (TW)

(73) Assignee: Nuvoton Technology Corporation, Hsinchu (TW)

( * ) Notice: Subject to any disclaimer, the term of this patent is extended or adjusted under 35 U.S.C. 154(b) by 244 days.

(21) Appl. No.: 13/831,919

(22) Filed: Mar. 15, 2013

(65) Prior Publication Data

US 2014/0223212 A1 Aug. 7, 2014

(30) Foreign Application Priority Data

Feb. 5, 2013 (TW) .............................. 102104455 A

(51) Int. Cl.
  *G06F 1/26* (2006.01)
  *G06F 1/28* (2006.01)

(52) U.S. Cl.
  CPC ................ *G06F 1/28* (2013.01); *G06F 1/266* (2013.01)

(58) Field of Classification Search
  CPC ...... G06F 1/3212; G06F 1/3287; G06F 1/266; G06F 1/28
  See application file for complete search history.

(56) References Cited

U.S. PATENT DOCUMENTS

| 5,978,921 | A | * | 11/1999 | Ryu | .............................. | 713/300 |
| 6,665,801 | B1 | * | 12/2003 | Weiss | ............................ | 713/300 |
| 6,947,272 | B2 | | 9/2005 | Daniels et al. | | |
| 6,968,466 | B2 | | 11/2005 | Bolian et al. | | |
| 7,673,156 | B1 | * | 3/2010 | Nojima | ........................ | 713/300 |
| 7,791,854 | B2 | | 9/2010 | Chu | | |
| RE42,079 | E | * | 1/2011 | Tate et al. | ..................... | 713/324 |
| 8,527,782 | B2 | * | 9/2013 | Griffin et al. | ................. | 713/300 |
| 8,830,073 | B2 | * | 9/2014 | Sims et al. | .................... | 340/635 |
| 8,862,921 | B1 | * | 10/2014 | Kim et al. | .................... | 713/323 |
| 2004/0243860 | A1 | | 12/2004 | Green et al. | | |
| 2006/0069931 | A1 | * | 3/2006 | Shin et al. | ................... | 713/300 |
| 2006/0129857 | A1 | * | 6/2006 | Liu et al. | ..................... | 713/320 |

(Continued)

*Primary Examiner* — Jaweed A Abbaszadeh
*Assistant Examiner* — Cheri Harrington
(74) *Attorney, Agent, or Firm* — Jianq Chyun IP Office

(57) ABSTRACT

A power management circuit is provided. The power management circuit includes a power switch, a current/voltage detector, a current setting unit, and a control unit. The power switch is coupled to a power supply of the computer system. When the power switch is turned on, it supplies an output current and an output voltage of the power supply to an external device. The current/voltage detector detects the magnitudes of the output current and the output voltage. The current setting unit sets a plurality of current thresholds. When the computer system is in a power-saving state and when the output current is greater than a first current threshold and smaller than a second current threshold or the output voltage is smaller than a first voltage threshold and larger than a second voltage threshold, the control unit issues a notification signal to execute a predetermined operation on the power supply.

13 Claims, 3 Drawing Sheets

(56) References Cited

U.S. PATENT DOCUMENTS

| | | | |
|---|---|---|---|
| 2009/0117861 A1* | 5/2009 | Hoefel | G06F 19/3418 |
| | | | 455/90.2 |
| 2010/0083007 A1* | 4/2010 | Howard et al. | 713/300 |
| 2010/0164440 A1 | 7/2010 | Ikeda | |
| 2013/0154551 A1* | 6/2013 | Jeansonne | G06F 1/266 |
| | | | 320/107 |
| 2013/0162198 A1* | 6/2013 | Yokota et al. | 320/107 |
| 2013/0166928 A1* | 6/2013 | Yang | 713/300 |
| 2013/0166934 A1* | 6/2013 | Chu | 713/323 |
| 2014/0040608 A1* | 2/2014 | Goodart et al. | 713/2 |
| 2015/0233596 A1* | 8/2015 | Warren | G05B 13/0265 |
| | | | 700/278 |

\* cited by examiner

LOW POWER MODE OPERATION WHEN CHARGING A DEVICE

CROSS-REFERENCE TO RELATED APPLICATION

This application claims the priority benefit of Taiwan application serial no. 102104455, filed on Feb. 5, 2013. The entirety of the above-mentioned patent application is hereby incorporated by reference herein and made a part of this specification.

BACKGROUND OF THE INVENTION

1. Field of the Invention

The present invention generally relates to a computer system, and more particularly, to a power management circuit and a power management method of the computer system.

2. Description of Related Art

The universal serial bus (USB) standard is an expansion bus standard broadly adopted by personal computer (PC) systems. Many existing USB devices support USB charging (for example, a PC allows a USB device, such as a cell phone, to charge its battery). Either a desktop PC or a notebook computer can supply power to its USB ports in the standby state (S3) and the soft-off state (S5) specified in the advanced configuration and power interface (ACPI) standardin order to support USB charging.

As to a USB device to be charged, the charging process should be as fast as possible, and the current supplied by the USB port should be as large as possible. However, the power supply unit of a general desktop PC supplies merely a current of at most 2 A in aforementioned standby state or soft-off state. If a USB device extracts a charging current greater than 2 A in the standby state or the soft-off state, the standby voltage of the power supply unit will be too low to allow the PC to boot up from the standby state or the soft-off state.

In a notebook computer supporting USB charging, there is an embedded controller (EC) which requires constant power supply in order to determine whether the power of a battery is adequate, so as to determine whether the computer system possesses the lowest power to boot up. However, when no device to be charged is plugged into the USB port, the EC requires constant power supply. As a result, the battery durability of the notebook computer is reduced.

SUMMARY OF THE INVENTION

An embodiment of the present invention provides a power management circuit. The power management circuit includes a power switch, a current/voltage detector, a current setting unit, and a control unit. The power switch is configured to couple to a power supply of a computer system. When the power switch is turned on, the power switch supplies an output current and an output voltage of the power supply to an external device. The current/voltage detector is coupled between the power switch and the external device. The current/voltage detector detects magnitudes of the output voltage and the output current. The current setting unit sets a plurality of current thresholds. The control unit is coupled to the power switch, the current/voltage detector, and the current setting unit. When the computer system is in a power-saving state and when the output current is greater than a first current threshold set by the current setting unit and smaller than a second current threshold set by the current setting unit or the output voltage is smaller than a first voltage threshold and larger than a second voltage threshold, the control unit issues a notification signal to execute a predetermined operation on the power supply.

An embodiment of the present invention provides a power management method including following steps. An output current and an output voltage of a power supply of a computer system are supplied to an external device. Magnitudes of the output voltage and the output current are detected. When the computer system is in a power-saving state and when the output current is greater than a first current threshold and smaller than a second current threshold or the output voltage is smaller than a first voltage threshold and larger than a second voltage threshold, a notification signal is issued to execute a predetermined operation on the power supply.

An embodiment of the present invention provides a computer system. The computer system includes a power supply, a power management circuit, and a controller. The power supply supplies power to the computer system and an external device. The power management circuit is coupled to the power supply and supplies an output current and an output voltage of the power supply to the external device. When the computer system is in a power-saving state and when the output current is greater than a first current threshold and smaller than a second current threshold or the output voltage is smaller than a first voltage threshold and larger than a second voltage threshold, the power management circuit issues a notification signal. The controller is coupled to the power supply and the power management circuit. When the controller receives the notification signal, the controller executes a predetermined operation on the power supply.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
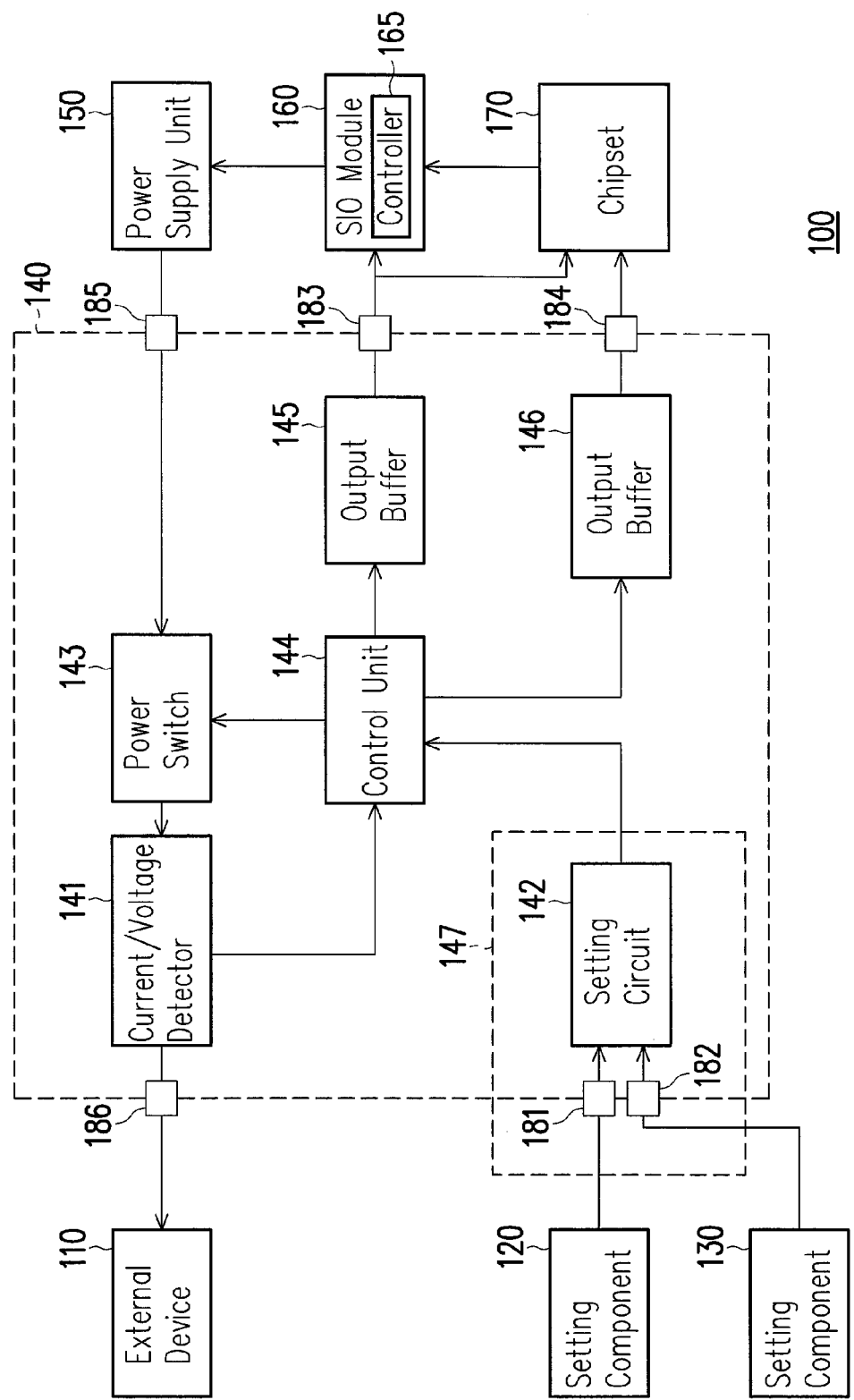
FIG. 1 is a diagram of a computer system according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a diagram of a computer system 100 according to an embodiment of the invention. Only those parts of the computer system 100 related to the present embodiment are illustrated in FIG. 1. The computer system 100 includes setting components 120 and 130, a power management circuit 140, a power supply unit 150, a super input/output (SIO) module 160, and a chipset 170. The power management circuit 140 includes a current/voltage detector 141, a current setting unit 147, a power switch 143, a control unit 144, output buffers 145 and 146, and pins 183-186. The current setting unit 147 includes a setting circuit 142 and pins 181 and 182. The SIO module 160 includes a controller 165.

The computer system 100 can be a desktop computer. However, in other embodiments of the invention, the computer system 100 may also be a notebook computer, an all-in-one personal computer, a mobile device, a handheld device, or any other electronic product. The power supply unit 150 is the power source of the computer system 100 and configured to supply power to the computer system 100 and an external device 110. The computer system 100 supports USB charging. For example, the power management circuit 140 may be a portion of a USB port, and the external device 110 may be a device (for example, a USB device such as cell phone) which can be connected to the USB port to be charged. The power management circuit 140 controls the power supply unit 150 to supply its output current and output voltage to the external device 110. In the present embodiment, the power management circuit 140 can be packaged as an individual integrated circuit (IC), and the pins 181-186 are pins of the IC. The embodiments of present invention is not limited to USB charging, and the computer system 100 can supply power to the external device 110 for any purpose (particularly, in the power-saving state). In the present embodiment, the power-saving state can be the standby state (S3) or the soft-off state (S5) specified in the advanced configuration and power interface (ACPI) standard. In the standby state (S3), most parts of the computer system are turned off and power may be supplied to, for example, the memory. In the soft-off state (S5), a small amount of power is supplied to some parts or components (for example, a south-bridge chip, a SIO module, or a network chip) of the computer system, while all the other parts are turned off.

The power switch 143 in the power management circuit 140 may be a power metal-oxide-semiconductor field-effect transistor (power MOSFET). The power switch 143 is configured to couple to the power supply unit 150. When the power switch 143 is turned on, it supplies the output current and the output voltage of the power supply unit 150 to the external device 110, and when the power switch 143 is turned off, it cuts off the supply of the output current and the output voltage. The current/voltage detector 141 is coupled between the power switch 143 and the external device 110. The current/voltage detector 141 detects the magnitudes of the output voltage and the output current and transmits the detection result to the control unit 144, so that the control unit 144 can determine whether to turn on or off the power switch 143.

The setting component 120 may be a resistor or a capacitor, and the setting component 130 may also be a resistor or a capacitor. The pins 181 and 182 are respectively configured to couple to the setting components 120 and 130, and the setting circuit 142 is coupled to the pins 181 and 182. The setting circuit 142 can output a current threshold TC1 according to the resistance or capacitance of the setting component 120 and output a current threshold TC2 according to the resistance or capacitance of the setting component 130, such that the current setting unit 147 can set a plurality of current thresholds. The current threshold TC1 output by the setting circuit 142 may be in proportion to the resistance or capacitance of the setting component 120. For example, if the setting component 120 is a resistor of 1KΩ, the setting circuit 142 can set the current threshold TC1 to be 1 A, and if the setting component 120 is a resistor of 3KΩ, the setting circuit 142 can set the current threshold TC1 to be 3 A. The same rule applies if the setting component 120 is a capacitor. Similarly, the current threshold TC2 output by the setting circuit 142 is in proportion to the resistance or capacitance of the setting component 130. The setting components 120 and 130 may not be the same type of components, and they can be any combination of resistors and/or capacitors.

The numbers of pins and setting components in the current setting unit 147 are not limited in embodiments of the invention and can be any positive integers. In some embodiments of the invention, the current setting unit 147 may also set a plurality of current thresholds through software.

Based on the settings mentioned above, the manufacturer of the computer system 100 or its motherboard can determine the values of the current thresholds TC1 and TC2 through the setting components 120 and 130. For example, there is usually an upper limit (for example, 2 A) on the output current supplied by the power supply unit of a computer system in the power-saving state. The current threshold TC1 can be a predetermined value smaller than the predetermined upper limit, and the current threshold TC2 can be set to be the predetermined upper limit. Additionally, the control unit 144 can set two voltage thresholds TV1 and TV2, and the voltage thresholds TV1 and TV2 are stored in the control unit 144, wherein TV1 is greater than TV2. If in the power-saving state, the output current of the power supply unit 150 is greater than TC1 and smaller than TC2, or the output voltage of the power supply unit 150 is smaller than TV1 and larger than TV2, the power supplied by the power supply unit 150 is close to its upper limit, and accordingly the computer system 100 may not be able to boot up from the power-saving state. If in the power-saving state, the output current of the power supply unit 150 is greater than the TC2, or the output voltage of the power supply unit 150 is smaller than TV2, a major abnormity may occur.

The control unit 144 is coupled to the power switch 143, the current/voltage detector 141, the current setting unit 147, and the output buffers 145 and 146. The control unit 144 receives the current thresholds TC1 and TC2 from the setting circuit 142. When the computer system 100 is in the power-saving state and when the output current of the power supply unit 150 is greater than the current threshold TC1 and smaller than the current threshold TC2 or the output voltage of the power supply unit 150 is smaller than the voltage threshold TV1 and larger than the voltage threshold TV2, the control unit 144 issues a first notification signal to the output buffer 145. When the computer system 100 is in the power-saving state and when the output current of the power supply unit 150 is greater than the current threshold TC2 (for example, greater than 2 A) or the output voltage of the power supply unit 150 is smaller than the voltage threshold TV2, the control unit 144 turns off the power switch 143 to cut off the output current supplied by the power supply unit 150 to the external device 110, so that overlarge current caused by any abnormity (for example, a short circuit) can be avoided.

The control unit 144 can instantly issue a second notification signal after it turns off the power switch 143 or issue the second notification signal after it turns off the power switch 143 and the output voltage goes up to a voltage threshold TV3. The voltage threshold TV3 may be different from the voltage thresholds TV1 and TV2. After the power switch 143 is turned off, the output voltage of the power supply unit 150 goes up to the voltage threshold TV3, which means the output voltage of the power supply unit 150 returns to its normal level. The voltage threshold TV3 may be greater than or equal to the voltage threshold TV1.

The control unit 144 can turn on the power switch 143, so as to resume the supply of the output current and the output voltage, after the power switch 143 is turned off and the output voltage goes up to the voltage threshold TV3. Or, in other embodiments of the invention, the control unit 144 may not execute this operation.

The output buffer 145 is coupled between the control unit 144 and the pin 183. The output buffer 145 transmits the first notification signal from the control unit 144 to the pin 183 and enhances the driving capability of the first notification signal. The output buffer 146 is coupled between the control unit 144 and the pin 184. The output buffer 146 transmits the second notification signal from the control unit 144 to the pin 184 and enhances the driving capability of the second notification signal. If the power management circuit 140 is not an individual IC, the output buffers 145 and 146 and the pins 183 and 184 can be omitted, and the control unit 144 can directly transmit the first notification signal and the second notification signal to the SIO module 160 and the chipset 170.

The SIO module 160 is coupled to the power supply unit 150 and the pin 183 of the power management circuit 140. The SIO module 160 controls PS2 devices (for example, the keyboard and mouse (not shown) of the computer system 100, and the controller 165 controls the power supply unit 150 of the computer system 100. The controller 165 can execute a predetermined operation on the power supply unit 150 when it receives the first notification signal from the control unit 144. The predetermined operation may be that the controller 165 starts the power supply unit 150 so that the power supply unit 150 can enter the working state from the power-saving state. However, herein the controller 165 does not issue any boot-up signal to the computer system 100. The output current supplied by the power supply unit 150 in the working state is greater than the output current supplied by the power supply unit 150 in the power-saving state. Herein the computer system 100 is still in the power-saving state, but the power supply unit 150 is already in the working state so that it not only supplies more power to the external device 110 but also supplies power to the computer system 100 to allow the computer system 100 to boot up from the power-saving state.

In the present embodiment, the power management circuit 140 can be packaged as an individual IC without incorporating the SIO module 160. However, in other embodiments of the invention, the SIO module 160 may also be integrated into the IC of the power management circuit 140.

The chipset 170 is coupled to the SIO module 160 and the pins 183 and 184 of the power management circuit 140. The output buffer 145 also transmits the first notification signal to the chipset 170 to notify the chipset 170 to execute necessary responsive operations.

When the control unit 144 issues the second notification signal, the output buffer 146 can transmit the second notification signal to the chipset 170. Once the chipset 170 receives the second notification signal, it executes a predetermined operation. For example, the control unit 144 issues the second notification signal after the power switch 143 is turned off and the output voltage goes up to the voltage threshold TV3, and when the chipset 170 receives the second notification signal, it can determine whether to turn on the power switch 143 to resume the output current supplied to the external device 110. In some other embodiments, the control unit 144 determines whether to turn on the power switch 143 to resume the output current supplied to the external device 110 after the output voltage goes up to the voltage threshold TV3. In yet some other embodiments, the chipset 170 may also execute other predetermined operations when it receives the second notification signal. In addition, the chipset 170 may send the second notification signal to the SIO module 160 to notify the SIO module 160 and the controller 165 to execute necessary responsive operations.

Figure 2:
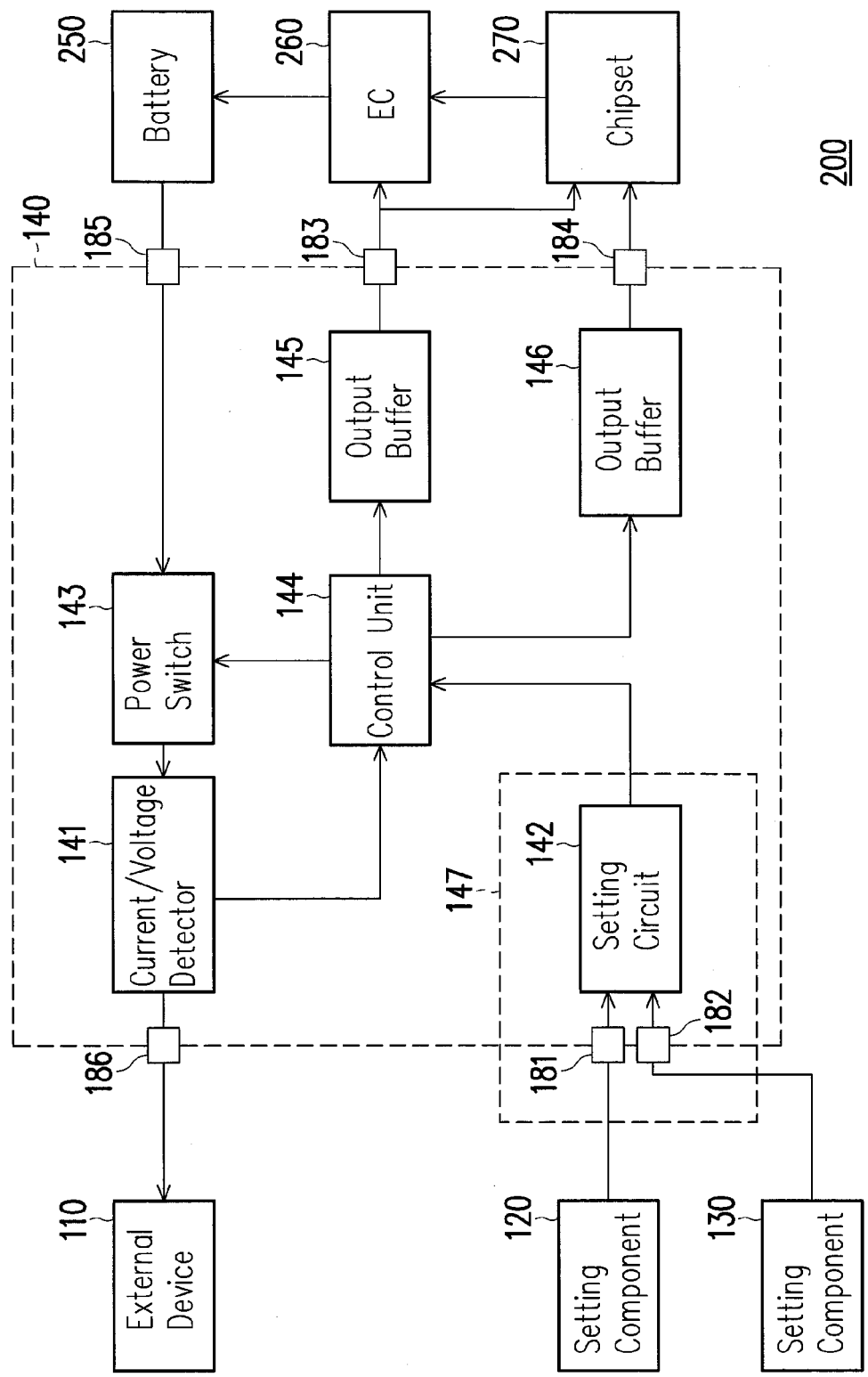
FIG. 2 is a diagram of a computer system according to another embodiment of the invention.

FIG. 2 is a diagram of a computer system 200 according to another embodiment of the invention. Only those parts of the computer system 200 related to the present embodiment are illustrated in FIG. 2. The computer system 200 includes setting components 120 and 130, a power management circuit 140, a battery 250, an embedded controller (EC) 260, and a chipset 270. All components in FIG. 2 except the battery 250, the EC 260, and the chipset 270 are the same as those corresponding components in FIG. 1.

In the present embodiment, the computer system 200 is a notebook computer. The battery 250 is coupled to the power switch 143 of the power management circuit 140. In the present embodiment, the battery 250 may be the power source of the computer system 200, and which supplies power to the entire computer system 200 and the external device 110. In the present embodiment, the power management circuit 140 supplies the output voltage and the output current of the battery 250 to the external device 110. Here the control unit 144 controls the output current and the output voltage supplied by the battery 250 to the external device 110 by turning on or off the power switch 143, and the control unit 144 issues a first notification signal and a second notification signal based on the variations of the output current and the output voltage. These aspects have been explained in detail in the embodiment illustrated in FIG. 1 therefore will not be explained herein.

The EC 260 is coupled to the battery 250, the chipset 270, and the pin 183. The chipset 270 is coupled to the pins 183 and 184 of the power management circuit 140. When the chipset 270 receives the first notification signal from the output buffer 145, it can relay the first notification signal to the EC 260. Once the EC 260 receives the first notification signal, it can execute a predetermined operation on the battery 250. For example, the predetermined operation may be that the EC 260 enters the working state from the power-saving state and starts monitoring the volume of electricity of the battery 250, so as to ensure that the computer system 200 possesses adequate power to boot up from the power-saving state. Thus, in the present embodiment, the first notification signal is a wake-up signal for waking up the EC 260. However, in other embodiments, the EC 260 may also receive the first notification signal from the output buffer 145 without going through the chipset 270. The power of the battery 250 consumed by the EC 260 in the power-saving state is less than that consumed in the working state. Namely, the EC 260 only monitors and consumes more power of the battery 250 when the output current supplied by the battery 250 to the external device 110 is greater than the current threshold TC1 and smaller than the current threshold TC2 or when the output voltage of the battery 250 is smaller than the voltage threshold TV1 and larger than the voltage threshold TV2. In other embodiments, the EC 260 continues to monitor the volume of electricity of the battery 250 even when the output current is greater than the current threshold TC2 or the output voltage of the battery 250 is lower than the voltage threshold TV2. Thereby, unnecessary power consumption of the EC 260 can be avoided, and the battery durability of the computer system 200 can be maintained.

In other embodiments, besides the battery 250, an external power supply unit may also be connected to the computer system 200. One or both of the battery 250 and the external power supply unit can supply the power required by the entire computer system 200 and the external device 110. In the present embodiment, the power management circuit 140 can also perform aforementioned operations. For example, the control unit 144 can issue the first notification signal to wake up the EC 260 and monitor the volume of electricity of the battery 250. In the present embodiment, because the external power supply unit can continuously charge the battery 250, the battery 250 can supply power to the entire computer system 200 and the external device 110, while the power of the battery 250 is not consumed in the power-saving state.

As described above, the chipset 270 executes a predetermined operation (for example, determines whether to turn on the power switch 143 to resume the supply of the output current and the output voltage to the external device 110) when it receives the second notification signal from the output buffer 146. In addition, the chipset 270 can send the second notification signal to the EC 260 to notify the EC 260 to execute necessary responsive operations.

Figure 3:
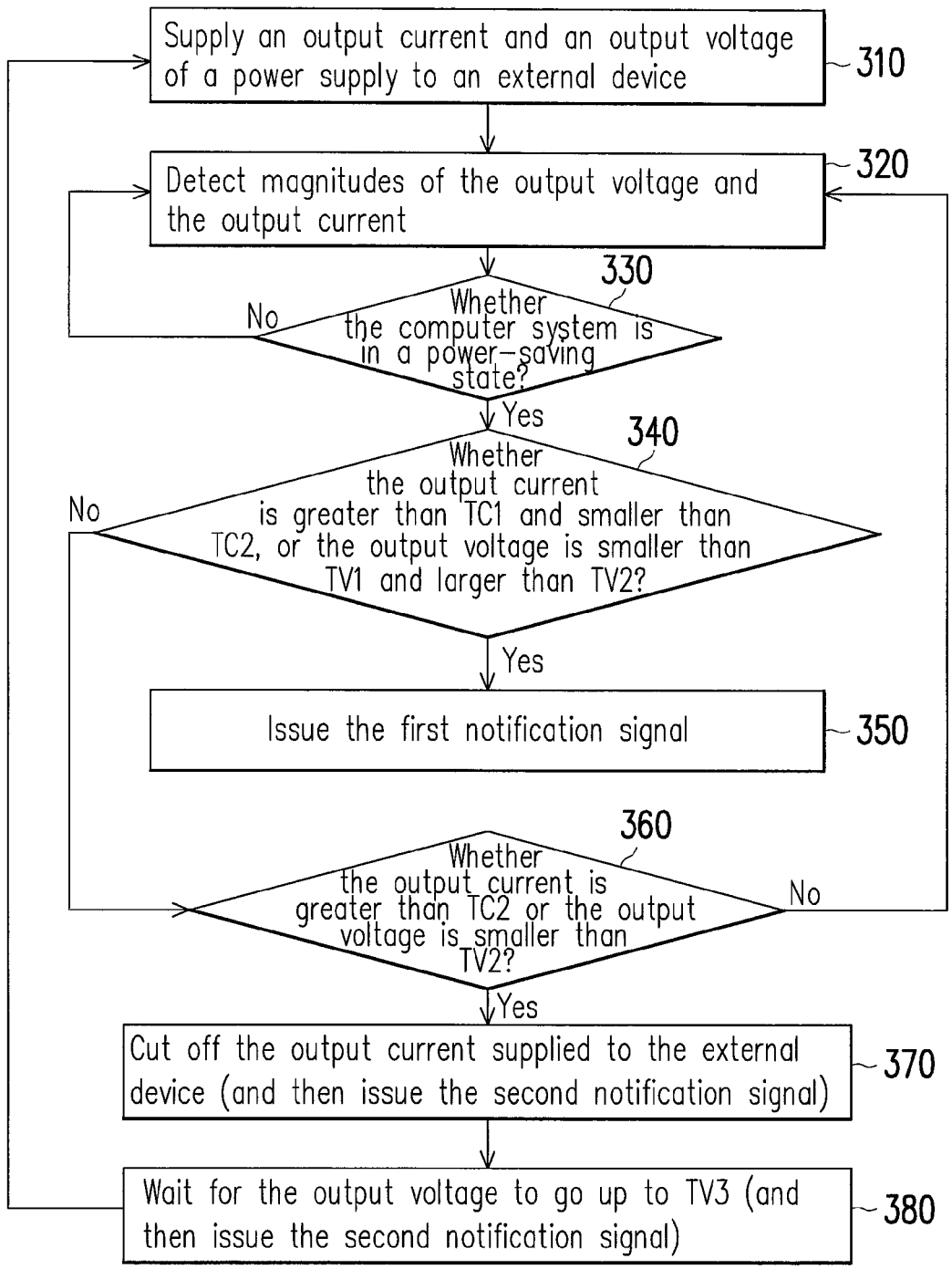
FIG. 3 is a flowchart of a power management method according to an embodiment of the invention.

FIG. 3 is a flowchart of a power management method according to an embodiment of the invention. In step 310, an output current and an output voltage of a power supply of a computer system are supplied to an external device. In step 320, magnitudes of the output voltage and the output current are detected. In step 330, whether the computer system is in a power-saving state is determined. If the computer system is not in the power-saving state, the procedure returns to step 320.

On the other hand, if the computer system is in the power-saving state, in step 340, whether the output current is greater than the current threshold TC1 and smaller than the current threshold TC2 or whether the output voltage is smaller than the voltage threshold TV1 and larger than the voltage threshold TV2 is determined. If the conditions in step 340 are false, step 360 is executed. If one of the conditions in step 340 is true, in step 350, a first notification signal is issued to execute a predetermined operation on the power supply. For example, the predetermined operation can be turning on the power supply but not issuing any boot-up signal to the computer system.

In step 360, whether the output current is greater than the current threshold TC2 or whether the output voltage is smaller than a voltage threshold TV2 is determined. If the conditions in step 360 are false, the procedure returns to step 320. If one of the conditions in step 360 is true, in step 370, the output current supplied by the power supply to the external device is cut off. In next step 380, the output voltage is waited to go up to a voltage threshold TV3. After that, step 310 is executed again to resume the supply of the output current.

A second notification signal is issued in one of the steps 370 and 380. To be specific, the second notification signal can be issued after the supply of the output current is cut off (in step 370) or after the output voltage goes up to the voltage threshold TV3 (in step 380).

The power management method illustrated in FIG. 3 can be carried out by the power management circuit 140 illustrated in FIG. 1 or FIG. 2, and since the details thereof have been described in the embodiments illustrated in FIG. 1 and FIG. 2, the method will not be further described herein.

As described above, in a power management circuit and a power management method provided by embodiments of the invention, an output voltage and an output current supplied by a power supply of a computer system to an external device can be continuously detected, and an external controller can be notified at appropriate time to turn on the power supply to supply more power or monitor the volume of electricity of a battery. In the power management circuit and the power management method provided by embodiments of the invention, the computer system is ensured to be able to boot up from a power-saving state even if the standby voltage is very low, and the battery durability of a notebook computer can be maintained. Moreover, in the power management circuit and the power management method provided by embodiments of the invention, when an abnormity occurs and the output current of the power supply is overlarge, the output current supplied to the external device can be cut off to protect the computer system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power management circuit, which is coupled to a computer system to additionally manage a power supply of the computer system to ensure that the computer system possesses adequate power to boot up, the power management circuit comprising:

a power switch, configured to couple to the power supply of the computer system, wherein when the power switch is turned on, the power switch supplies an output current and an output voltage of the power supply to an external device;

a current/voltage detector, coupled between the power switch and the external device, and detecting magnitudes of the output voltage and the output current; and a control unit, coupled to the power switch, and the current/voltage detector, and defining a first threshold voltage to be an amount of voltage to which the power supply provides to the external device while the power supply still has sufficient power to boot up the computer from a power-saving state, wherein when the computer system is in the power-saving state and when the output voltage is smaller than the first voltage threshold and larger than a second voltage threshold, the control unit issues a first notification signal instructing the power supply to enter a working state from the power-saving state, wherein when the computer system is in the power-saving state and the output voltage is smaller than the second voltage threshold, the control unit turns off the power switch to cut off the output current supplied by the power supply to the external device, wherein the control unit issues a second notification signal after the control unit turns off the power switch and the output voltage of the power supply reaches a third voltage threshold due to cutting off the output current to the external device, wherein the third voltage threshold is greater than or equal to the first voltage threshold, wherein the control unit turns on the power switch to resume the supply of the output current and the output voltage after the control unit turns off the power switch and the output voltage of the power supply reaches the third voltage threshhold due to cutting off the output current to the external device.

2. The power management circuit according to claim 1, wherein the power-saving state is a standby state (S3) or a soft-off state (S5) specified in an advanced configuration and power interface (ACPI) standard.

3. The power management circuit according to claim 1, wherein the control unit issues the first notification signal to a controller such that the controller turns on the power supply from the power-saving state to supply more power to the external device.

4. The power management circuit according to claim 1, further comprising:
a super input/output (SIO) module, receiving the first notification signal to turn on the power supply from the power-saving state to supply more power to the external device.

5. The power management circuit according to claim 1, wherein the first notification signal is a wake-up signal, and the control unit issues the wake-up signal to wake up an embedded controller (EC) of the computer system such that the EC monitors an amount of charge in the power supply.

6. The power management circuit according to claim 1, wherein the power supply is a battery, and the controller instructs the power supply to enter the working state from the power saving state and starts monitoring the volume of electricity of the battery to ensure that the computer system possesses adequate power to boot up from the power-saving state.

7. The power management circuit according to claim 1, further comprising:
defining the second voltage threshold to be amount of voltage provided by the power supply which is insufficient to boot up the computer from the power-saving state, and
when the output voltage of the power supply is smaller than the second voltage threshold, cutting off the output current to the external device by turning off the power switch, so that the output voltage of the power supply is able to go up to the third voltage threshold after the control unit turns off the power switch.

8. A power management method, for additionally managing a power supply of a computer system to ensure that the computer system possesses adequate power to boot up, the power management method comprising:
supplying an output current and an output voltage of the power supply of the computer system to an external device;
detecting magnitudes of the output voltage;
defining a first threshold voltage to be amount of voltage to which the power supply provides to the external device while the power supply still has sufficient power to boot up the computer from a power-saving state;
when the computer system is in the power-saving state and when the output voltage is smaller than the first voltage threshold and larger than a second voltage threshold, issuing a first notification signal instructing the power supply to enter a working state from the power-saving state;
when the computer system is in the power-saving state and the output voltage is smaller than the second voltage threshold, cutting off the output current supplied by the power supply to the external device;
issuing a second notification signal after the output current s cut off and the output voltage of the power supply reach a third voltage threshold due to cutting off the output current to the external device, wherein the third voltage threshold is greater than or equal to the first voltage threshold; and
resuming the supply of the output current and the output voltage after the output voltage of the power supply reaches the third voltage threshold due to cutting off the output current to the external device.

9. The power management method according to claim 8, wherein the first notification signal is a wake-up signal, and the power management method further comprising:
issuing the wake-up signal to wake up an embedded controller (EC) of the computer system such that the EC monitors an amount of charge in the power supply.

10. A computer system, comprising:
a power supply, supplying power to the computer system and an external device;
a power management circuit, coupled to the power supply to additionally manage the power supply of the computer system and to ensure that the computer system possesses adequate power to boot up, and supplying an output current and an output voltage of the power supply to the external device, wherein when the power management circuit is still under operation when the computer system is in a power-saving state and when the output voltage is smaller than a first voltage threshold and larger than a second voltage threshold, the power management circuit issues a first notification signal, wherein the first threshold voltage is defined to be amount of voltage to which the power supply provides to the external device while the power supply still has sufficient power to boot up the computer from the power-saving state; and
a controller, coupled to the power supply and the power management circuit, wherein when the controller receives the first notification signal, the controller instructs the power supply to enter a working state from the power saving state,
wherein when the computer system is in the power-saving state and the output voltage is smaller than the second voltage threshold, the power management circuit cuts off the output current supplied by the power supply to the external device,
wherein the power management circuit issues a second notification signal after the power management circuit cuts off the output current and the output voltage of the power supply reaches a third voltage threshold due to cutting off the output current to the external device, the third voltage threshold is greater than or equal to the first voltage threshold,
wherein the power management circuit resumes the supply of the output current and the output voltage after the power management circuit cuts off the output current and the output voltage of the power supply reaches the third voltage threshold due to cutting off the output current to the external device.

11. The computer system according to claim 10, wherein the computer system is a desktop computer, the power supply is a power supply unit of the computer system, the controller instructing the power supply to enter the working state is that the controller turns on the power supply so that the power supply enters a working state from the power-saving state, and the output current supplied by the power supply in the working state is greater than the output current supplied by the power supply in the power-saving state, wherein a boot-up signal is not yet issued to the computer system in response to the first notification signal.

12. The computer system according to claim 10, wherein the computer system is a notebook computer, the power supply is a battery of the computer system, the controller instructing the power supply to enter the working state is that the controller enters the working state from the power-saving state and starts monitoring an amount of charge in the power supply, and a power consumed by the controller in the power-saving state is smaller than a power consumed by the controller in the working state.

13. The computer system according to claim 10, further comprising:
   a chipset, coupled to the power management circuit, wherein when the chipset receives the second notification signal, the chipset executes a predetermined operation.

* * * * *